(12) United States Patent
Li et al.

(10) Patent No.: US 11,626,627 B2
(45) Date of Patent: Apr. 11, 2023

(54) METHOD AND SYSTEM FOR PREVENTING BATTERY THERMAL RUNAWAY

(71) Applicant: Guangzhou Automobile Group Co., Ltd., Guangdong (CN)

(72) Inventors: Xiaohui Li, Sunnyvale, CA (US); Bozhi Yang, Sunnyvale, CA (US); Chen Zhang, Sunnyvale, CA (US); Ruiming Zhu, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 274 days.

(21) Appl. No.: 17/030,366

(22) Filed: Sep. 23, 2020

(65) Prior Publication Data

US 2022/0093983 A1 Mar. 24, 2022

(51) Int. Cl.
| | |
|---|---|
| *H01M 10/48* | (2006.01) |
| *H01M 10/667* | (2014.01) |
| *H01M 10/6571* | (2014.01) |
| *H01M 10/6568* | (2014.01) |
| *H01M 10/42* | (2006.01) |
| *H01M 10/635* | (2014.01) |
| *H01M 10/44* | (2006.01) |
| *H01M 10/63* | (2014.01) |
| *H02J 7/00* | (2006.01) |

(52) U.S. Cl.
CPC ....... *H01M 10/482* (2013.01); *H01M 10/425* (2013.01); *H01M 10/44* (2013.01); *H01M 10/443* (2013.01); *H01M 10/63* (2015.04); *H01M 10/635* (2015.04); *H01M 10/6568* (2015.04); *H01M 10/6571* (2015.04); *H01M 10/667* (2015.04); *H01M 2200/106* (2013.01); *H02J 7/00309* (2020.01)

(58) Field of Classification Search
None
See application file for complete search history.

(56) References Cited

U.S. PATENT DOCUMENTS

| | | | |
|---|---|---|---|
| 2013/0071717 A1* | 3/2013 | Muniz | H01M 10/617 429/120 |
| 2017/0125860 A1* | 5/2017 | Chatroux | H01M 10/63 |
| 2022/0021090 A1* | 1/2022 | Shin | H01M 50/209 |

* cited by examiner

*Primary Examiner* — Jonathan Crepeau
(74) *Attorney, Agent, or Firm* — ScienBiziP, P.C.

(57) ABSTRACT

A method and system for preventing battery thermal runaway are provided. The method includes: detecting or predicting whether there is a thermal runaway risk for each battery cell or battery module of a battery pack; and in response to detecting or predicting that there is a thermal runaway risk for at least one battery cell or battery module of the battery pack, transferring battery energy of the at least one battery cell or battery module to the battery pack or another battery pack as thermal energy or electric energy.

18 Claims, 8 Drawing Sheets

---

Detecting or predicting whether there is a thermal runaway risk for each battery cell or battery module of a battery pack — S102

↓

In response to detecting or predicting that there is a thermal runaway risk for at least one battery cell or battery module of the battery pack, transferring battery energy of the at least one battery cell or battery module to the battery pack or another battery pack as thermal energy or electric energy — S104

METHOD AND SYSTEM FOR PREVENTING BATTERY THERMAL RUNAWAY

TECHNICAL FIELD

The present disclosure relates to the field of battery safety, in particular to a method and system for preventing battery thermal runaway.

BACKGROUND

Nowadays, batteries (e.g., lithium ion batteries) are getting increasingly higher energy density, such as lithium-ion batteries in electric vehicles or electric bikes (e.g., currently used traction lithium-ion batteries for electric vehicles or electric bikes), lithium ion batteries for cell phones, laptop notebooks, portable devices, energy storage stations, power banks, electric robots, etc. However, uncontrollable thermal runaway becomes a challenging issue. Effective methods (to predict thermal runaway, or to dissipate the energy and lower its severity of damage) are needed to address the battery safety (especially thermal runaway) issue.

Although various methods for accurate prediction and prevention of the battery thermal runaway have been proposed to predict the battery thermal runaway, after it is predicted, few solutions are provided to handle the risky cell. Some common methods to increase battery safety include improved cell chemistry, optimized cell/module pack design, better cooling, accurate prediction of internal shorting (thermal runaway) using big data/AI/physics models, and more advanced control and BMS (battery management system), etc. But so far prevention of the battery thermal runaway is very challenging, and effective methods are needed.

SUMMARY

The following presents a simplified summary in order to provide a basic understanding of some aspects of the present disclosure. This summary is not an extensive overview of the present disclosure. It is intended neither to identify key or critical element of the present disclosure. The following summary merely presents some concepts of the present disclosure in a simplified form as a prelude to the description below.

In accordance with an aspect of the present disclosure, a method for preventing battery thermal runaway, including: detecting or predicting whether there is a thermal runaway risk for each battery cell or battery module of a battery pack; and in response to detecting or predicting that there is a thermal runaway risk for at least one battery cell or battery module of the battery pack, transferring battery energy of the at least one battery cell or battery module to the battery pack or another battery pack as thermal energy or electric energy.

In at least one exemplary embodiment of the present disclosure, detecting or predicting whether there is a thermal runaway risk for each battery cell or battery module of a battery pack includes: collecting information of every battery cell or battery module of the battery pack; detecting or predicting, based on the collected information, whether there is a thermal runaway risk for each battery cell or battery module of the battery pack.

In at least one exemplary embodiment of the present disclosure, transferring battery energy of the at least one battery cell or battery module to the battery pack or another battery pack as thermal energy or electric energy includes at least one of: a first transferring mode of transferring the battery energy of the at least one battery cell or battery module to the battery pack or another battery pack as thermal energy through a battery coolant loop for the battery pack or another battery pack; a second transferring mode of transferring the battery energy of the at least one battery cell or battery module to the battery pack or another battery pack as thermal energy through heating elements attached to battery sidewalls for battery cells or battery modules of the battery pack or another battery pack; a third transferring mode of transferring the battery energy of the at least one battery cell or battery module to the battery pack or another battery pack as electric energy through discharging and recycling the battery energy of the at least one battery cell or battery module to charge the battery pack or another battery pack with the help of at least one step-up DC/DC converter.

In at least one exemplary embodiment of the present disclosure, in the first transferring mode, the at least one battery cell or battery module is connected with at least one of the following elements connected in or connected to the battery coolant loop for the battery pack or another battery pack: a heating device, a coolant pump, a traction motor, an inverter, a charger.

In at least one exemplary embodiment of the present disclosure, the heating device includes at least one of: a resistive heater, a Positive Temperature Coefficient (PTC) heater, a High Voltage (HV) heater; or, the traction motor and the inverter serve as heat generation devices by running at an efficiency lower than a preset efficiency threshold.

In at least one exemplary embodiment of the present disclosure, in a case where the at least one element connected in or connected to the battery coolant loop for the battery pack or another battery pack requires a voltage higher than a voltage of the at least one battery cell or battery module, the at least one battery cell or battery module is connected with the at least one element through at least one step-up DC/DC converter which increases the voltage of the at least one battery cell or battery module to the voltage required by the at least one element.

In at least one exemplary embodiment of the present disclosure, in the second transferring mode, the at least one battery cell or battery module is connected with the heating elements attached to the battery sidewalls for the battery cells or battery modules of the battery pack or another battery pack.

In at least one exemplary embodiment of the present disclosure, the heating elements include at least one of: resistive heaters, resistive heating elements.

In at least one exemplary embodiment of the present disclosure, in the third transferring mode, the at least one battery cell or battery module is connected, through the at least one step-up DC/DC converter, to the entire battery pack, or another battery pack, or a group of battery cells or battery modules in the battery pack, or a group of battery cells or battery modules in another battery pack.

In at least one exemplary embodiment of the present disclosure, in a case where the battery pack or another battery pack is located in an environment with temperature lower than a temperature threshold, the first transferring mode or the second transferring mode is adopted; and/or, in a case where no thermal management for the battery pack or another battery pack is provided, the third transferring mode is adopted.

In accordance with another aspect of the embodiments of the present disclosure, a system for preventing battery thermal runaway is provided, including: a battery pack provided with multiple battery cells or battery modules;

switches or pairs of switches connected with respective battery cells or battery modules of the battery pack, and used for controlling, upon receiving an activation instruction, connection of respective battery cells or battery modules of the battery pack to a protection circuit; a detection and prediction component, configured to detect or predict whether there is a thermal runaway risk for each battery cell or battery module of the battery pack, and send, in response to detecting or predicting that there is a thermal runaway risk for at least one battery cell or battery module of the battery pack, the activation instruction to each switch or pair of switches corresponding to the at least one battery cell or battery module; and the protection circuit which, when being connected with the at least one battery cell or battery module, transfers battery energy of the at least one battery cell or battery module to the battery pack or another battery pack as thermal energy or electric energy.

In at least one exemplary embodiment of the present disclosure, the detection and prediction component is configured to detect or predict whether there is a thermal runaway risk for each battery cell or battery module of the battery pack in the following manner: collecting information of every battery cell or battery module of the battery pack; detecting or predicting, based on the collected information, whether there is a thermal runaway risk for each battery cell or battery module of the battery pack.

In at least one exemplary embodiment of the present disclosure, the protection circuit, when being connected with the at least one battery cell or battery module, transfers the battery energy of the at least one battery cell or battery module to the battery pack or another battery pack as thermal energy or electric energy in at least one of the following modes: a first transferring mode of transferring the battery energy of the at least one battery cell or battery module to the battery pack or another battery pack as thermal energy through a battery coolant loop for the battery pack or another battery pack; a second transferring mode of transferring the battery energy of the at least one battery cell or battery module to the battery pack or another battery pack as thermal energy through heating elements attached to battery sidewalls for battery cells or battery modules of the battery pack or another battery pack; a third transferring mode of transferring the battery energy of the at least one battery cell or battery module to the battery pack or another battery pack as electric energy through discharging and recycling the battery energy of the at least one battery cell or battery module to charge the battery pack or another battery pack with the help of at least one step-up DC/DC converter.

In at least one exemplary embodiment of the present disclosure, in the first transferring mode, the protection circuit includes at least one of the following elements connected in or connected to the battery coolant loop for the battery pack or another battery pack: a heating device, a coolant pump, a traction motor, an inverter, a charger.

In at least one exemplary embodiment of the present disclosure, the heating device includes at least one of: a resistive heater, a Positive Temperature Coefficient (PTC) heater, a High Voltage (HV) heater; or, the traction motor and the inverter serve as heat generation devices by running at an efficiency lower than a preset efficiency threshold.

In at least one exemplary embodiment of the present disclosure, in a case where the at least one element connected in or connected to the battery coolant loop for the battery pack or another battery pack requires a voltage higher than a voltage of the at least one battery cell or battery module, the at least one battery cell or battery module is connected with the at least one element through at least one step-up DC/DC converter which increases the voltage of the at least one battery cell or battery module to the voltage required by the at least one element.

In at least one exemplary embodiment of the present disclosure, in the second transferring mode, the protection circuit includes the heating elements attached to the battery sidewalls for the battery cells or battery modules of the battery pack or another battery pack.

In at least one exemplary embodiment of the present disclosure, the heating elements include at least one of: resistive heaters, resistive heating elements.

In at least one exemplary embodiment of the present disclosure, in the third transferring mode, the protection circuit includes the at least one step-up DC/DC converter, and the at least one battery cell or battery module is connected, through the at least one step-up DC/DC converter, to the entire battery pack, or another battery pack, or a group of battery cells or battery modules in the battery pack, or a group of battery cells or battery modules in another battery pack.

In at least one exemplary embodiment of the present disclosure, in a case where the battery pack or another battery pack is located in an environment with temperature lower than a temperature threshold, the first transferring mode or the second transferring mode is adopted for the protection circuit; and/or, in a case where no thermal management for the battery pack or another battery pack is provided, the third transferring mode is adopted for the protection circuit.

In at least one exemplary embodiment of the present disclosure, the detection and prediction component is connected with or located in a battery management system (BMS) of the battery pack.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings.

DETAILED DESCRIPTION OF THE EMBODIMENTS

Figure 1:
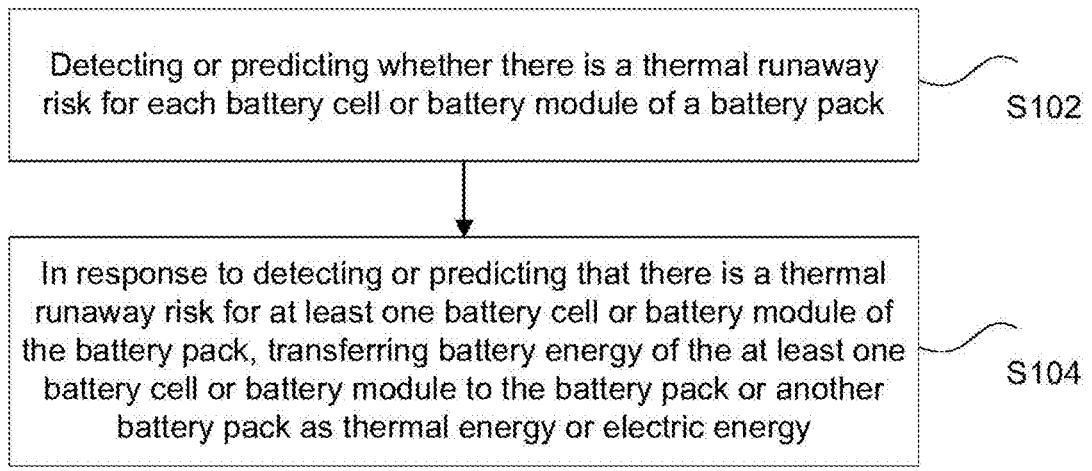
FIG. 1 shows a flow chart of a method for preventing battery thermal runaway according to an embodiment of the present disclosure.

Currently battery thermal runaway is considered the single most important safety issue to solve for electric vehicles, even more important than range, battery cost, charging time.

In view of this problem, the embodiments of the present disclosure propose solutions to prevent thermal runaway of battery cell from happening, after this cell is predicted to be at risk of thermal runaway. The idea is to control and dissipate the energy of the single risky cell (or risky module) to the entire traction battery pack (or other battery pack, or a group of cells/modules in the battery pack, or a group of cells/modules in other battery pack), using the existing battery and battery thermal management system (coolant loop, coolant pump, cold plate, battery heater, etc.). Once a cell is de-energized, it will have much lower chance of thermal runaway and propagation to neighbor cells. The energy of problem cell or module can be transferred to the battery pack or other battery pack as thermal energy (by battery coolant loop or sidewall heating elements) or electric energy (by charging circuit). Thermal mass of the battery pack is typically many times (usually more than 10s-100s times) that of a single cell or module, therefore the traction battery pack is naturally a great heat sink to absorb the cell energy before thermal runaway happens. The whole thermal management system (coolant and the motor/inverter/gear box) even the vehicle body may also serve as part of the heat sink, in addition to the battery pack. Also the battery pack, which is an electric energy storage device, can be used to store the electric energy released from the problem battery after a battery thermal runaway is predicted.

In order to make those skilled in the art understand the solutions of the present disclosure more clearly, the technical solutions in the embodiments of the present disclosure are clearly and completely elaborated below in combination with the accompanying drawings. It is apparent that the described embodiments are only a part of the embodiments of the present disclosure but not all. Based on the embodiments of the present disclosure, all the other embodiments obtained by those of ordinary skill in the art on the premise of not contributing creative effort belong to the scope of protection of the present disclosure.

It is to be noted that the terms like "first" and "second" in the specification, the claims and the accompanying drawings of the present disclosure are used for differentiating the similar objects, but do not have to describe a specific order or a sequence. It should be understood that the objects may be exchanged under appropriate circumstances, so that the embodiments of the present disclosure described here may be implemented in an order different from that described or shown here. Moreover, the terms like "include" and "have" and any variation of them are intended to cover nonexclusive including; for example, the process, method, system, product or device including a series of steps or units do not have to be limited to those clearly listed steps or units, but may include other steps or units which are not clearly listed or inherent in these process, method, system, product or device.

In accordance with an embodiment of the present disclosure, a method for preventing battery thermal runaway is provided. The method may be applied in any type of lithium ion batteries, such as the batteries for cell phone, laptop notebook, portable device, energy storage station, power bank, electric vehicles, electric bikes, electric robots, etc. FIG. 1 shows a flow chart of a method for preventing battery thermal runaway according to an embodiment of the present disclosure. As shown in FIG. 1, the method for preventing battery thermal runaway includes the following operations S102 and S104.

In operation S102, whether there is a thermal runaway risk for each battery cell or battery module of a battery pack is detected or predicted.

In at least one exemplary embodiment of the present disclosure, the operation S102 may be implemented in the following manner: collecting information of every battery cell or battery module of the battery pack; detecting or predicting, based on the collected information, whether there is a thermal runaway risk for each battery cell or battery module of the battery pack.

In practical situations, the battery thermal runaway may occur due to mechanical abuse, electric abuse, or thermal abuse. Statistic data show that more than 90% of battery thermal runaway is due to internal short circuit inside a battery cell, which may happen during the entire battery lifetime. Besides internal short circuit, lithium plating in anode and Oxygen release degradation in cathode material are the other two significant root causes of thermal runaway. In at least one exemplary embodiment of the present disclosure, in order to effectively detect or predict the thermal runaway risk, the operation S102 may include at least one of the following operations.

In operation S102-1, an internal short circuit inside the at least one battery cell or battery module is detected. Most (>90%) mechanical, electrical and thermal abuse would cause internal short circuit, and then consequently thermal run away. So if the energy in the battery cell or battery module can be removed when internal short circuit is detected or predicted, battery thermal runaway should be able to be prevented from happening next. There may be various means for detecting or predicting internal short circuit inside the battery cell or battery module. In at least one exemplary embodiment of the present disclosure, the operation of detecting or predicting an internal short circuit inside the at least one battery cell or battery module may include: calculating real-time information of every battery cell of the battery pack, wherein real-time information includes at least one of: partial derivative of voltage and time, internal resistance of real time, phase of internal impedance of real time; and determining, based on the real-time information, whether there is a thermal runaway risk for each battery cell or battery module of a battery pack. There may be other means for detecting or predicting internal short circuit inside the battery cell or battery module, and the method for preventing battery thermal runaway in the embodiments of the present disclosure has no limitation on the specific methods adopted for detecting or predicting the internal short circuit.

In operation S102-2, unwanted Lithium plating on an anode of the at least one battery cell or battery module is detected. Unwanted Lithium plating on an anode of the battery cell or battery module would sometimes induce internal short circuit and then thermal runaway, or induce a quick temperature rise and then thermal runaway. So if the energy in the battery cell or battery module can be removed when unwanted Lithium plating on an anode of the battery cell is detected or predicted, battery thermal runaway should be able to be prevented from happening next. There may be various means for detecting or predicting the unwanted Lithium plating on the anode of the at least one battery cell or battery module.

In operation S102-3, a preset amount of temperature rise within a preset period of time in the at least one battery cell or battery module is detected. This operation is to detect or predict a relatively quick temperature rise in the battery cell or battery module, which is also a factor causing the battery thermal runaway. So if the energy in the battery cell or battery module can be removed when a preset amount of temperature rise within a preset period of time is detected or predicted in the at least one battery cell or battery module, battery thermal runaway should be able to be prevented from happening next. There may be various means for detecting or predicting the quick temperature rise in the at least one battery cell or battery module. In at least one exemplary embodiment of the present disclosure, the operation of detecting or predicting the quick temperature rise may include: detecting a preset amount of temperature rise within a preset period of time in the at least one battery cell or battery module, herein the specific values for the preset amount and the preset period of time may be obtained by experiment or simulation, so that an abnormal temperature rise can be efficiently and properly detected or predicted.

In operation S104, in response to detecting or predicting that there is a thermal runaway risk for at least one battery cell or battery module of the battery pack, battery energy of the at least one battery cell or battery module is transferred to the battery pack or another battery pack as thermal energy or electric energy.

During practical implementation, the battery energy of the at least one battery cell or battery module may be transferred to the battery pack or another battery pack as thermal energy or electric energy in at least one of the following modes.

(1) A first transferring mode is to transfer the battery energy of the at least one battery cell or battery module to the battery pack or another battery pack as thermal energy through a battery coolant loop for the battery pack or another battery pack.

In the first transferring mode, the at least one battery cell or battery module may be connected with at least one of the following elements connected in or connected to the battery coolant loop for the battery pack or another battery pack: a heating device (which may include at least one of: a resistive heater, a Positive Temperature Coefficient (PTC) heater, a High Voltage (HV) heater), a coolant pump (which is used for driving the coolant to flow in the battery coolant loop, so that thermal exchange can be conducted with elements connected in or to the battery coolant loop), a traction motor, an inverter (the traction motor and the inverter can serve as heat generation devices by running at an efficiency (e.g., zero torque which leads to zero efficiency) lower than a preset efficiency threshold), a charger.

In at least one exemplary embodiment of the present disclosure, in a case where the at least one element connected in or connected to the battery coolant loop for the battery pack or another battery pack requires a voltage higher than a voltage of the at least one battery cell or battery module, for example, if the an HV heater is adopted to serve as the heating device, the at least one battery cell or battery module can be connected with the at least one element through at least one step-up DC/DC converter which increases the voltage of the at least one battery cell or battery module to the voltage required by the at least one element.

(2) A second transferring mode is to transfer the battery energy of the at least one battery cell or battery module to the battery pack or another battery pack as thermal energy through heating elements attached to battery sidewalls for battery cells or battery modules of the battery pack or another battery pack.

In the second transferring mode, the at least one battery cell or battery module may be connected with the heating elements (which may include at least one of: resistive heaters, resistive heating elements) attached to the battery sidewalls for the battery cells or battery modules of the battery pack or another battery pack, so that the energy of the at least one battery cell or battery module can be transferred to heat around the battery cells or battery modules of the battery pack or another battery pack.

(3) A third transferring mode is to transfer the battery energy of the at least one battery cell or battery module to the battery pack or another battery pack as electric energy through discharging and recycling the battery energy of the at least one battery cell or battery module to charge the battery pack or another battery pack with the help of at least one step-up DC/DC converter.

In the third transferring mode, the at least one battery cell or battery module may be connected, through the at least one step-up DC/DC converter, to the entire battery pack, or another battery pack, or a group of battery cells or battery modules in the battery pack, or a group of battery cells or battery modules in another battery pack.

Among the three transferring modes, since the first and second transferring modes have the effect of transferring the energy of the risk battery cell or battery module into heat, these two transferring modes are more suitable for the case where the battery pack or another battery pack is located in an environment with temperature lower than a temperature threshold (which may be set according to practical requirements). For the case where the battery pack or another battery pack is located in an environment with temperature higher than a temperature threshold, or the case where no thermal management for the battery pack or another battery pack is provided, the third transferring mode may be adopted.

By virtue of the solution in the aforementioned embodiments, the battery thermal runaway inside a risk battery cell or battery module can be effectively prevented.

It is to be noted that for the sake of simple description, each aforementioned embodiment of the method is described as a series of action combinations. But those skilled in the art should know that the present disclosure is not limited to a sequence of the described actions, it is because some steps may be performed in other sequences or simultaneously according to the present disclosure. Besides, those skilled in the art should also know that all the embodiments described in the specification are preferred embodiments, and the actions and modules involved may not be necessary.

Figure 2:
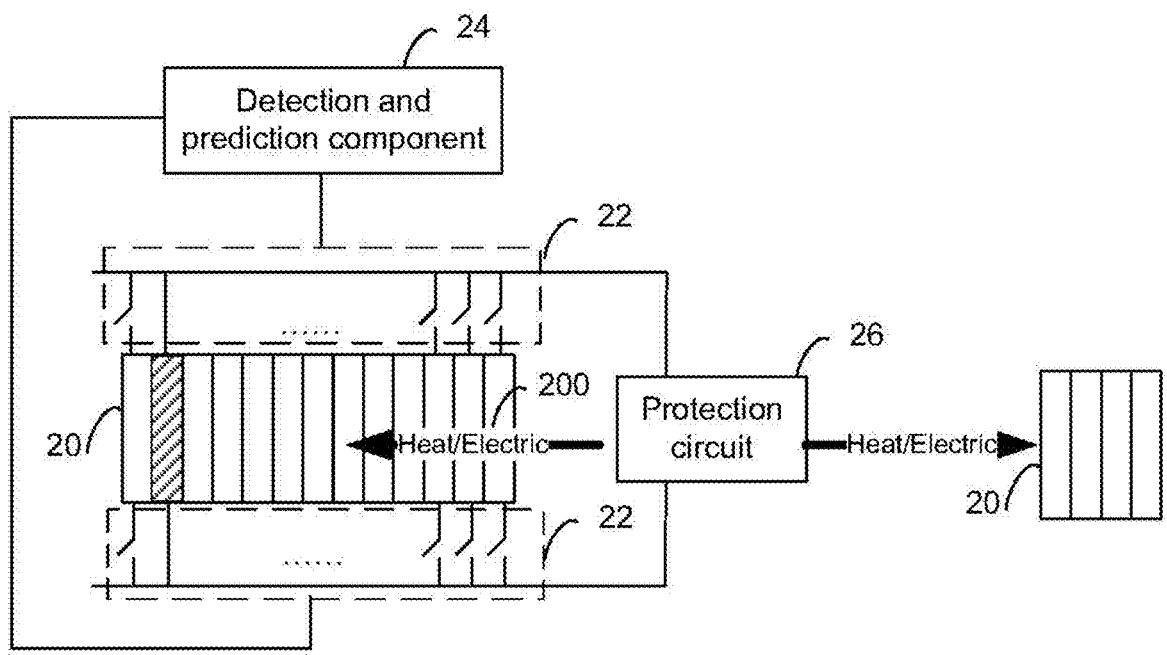
FIG. 2 shows a schematic diagram of the structure of a system for preventing battery thermal runaway according to an embodiment of the present disclosure.

In accordance with another embodiment of the present disclosure, a system for preventing battery thermal runaway is provided. The system for preventing battery thermal runaway may be applied to any terminal or equipment or vehicle with lithium ion batteries, such as cell phone, laptop notebook, portable device, energy storage station, power bank, electric vehicles, electric bikes, electric robots, etc. FIG. 2 shows a schematic diagram of the structure of a system for preventing battery thermal runaway according to an embodiment of the present disclosure. As shown in FIG. 2, the system for preventing battery thermal runaway includes:

a battery pack 20 provided with multiple battery cells or battery modules 200;

switches or pairs of switches 22 (in FIG. 2, a situation where a pair of switches 22 is connected with each battery cell or battery module 200 is shown, those skilled in the art should understand that a situation where a switch 22 is connected with each battery cell or battery module 200 is also conceivable) connected with respective battery cells or battery modules 200 of the battery pack 20, and used for controlling, upon receiving an activation instruction, connection of respective battery cells or battery modules 200 of the battery pack 20 to a protection circuit 26, wherein each switch or each pair of switches 22 cuts off the connection of the battery cell or battery module 200 corresponding to the switch or the pair of switches 22 to the protection circuit 26 as an initial state, and in response to receiving an activation instruction, switches on the connection of the battery cell or battery module 200 corresponding to the switch or the pair of switches 22 to the protection circuit 26;

a detection and prediction component 24 (which may be connected with or located in a battery management system (BMS) of the battery pack 20), configured to detect or predict whether there is a thermal runaway risk for each battery cell or battery module 200 of the battery pack 20, and send, in response to detecting or predicting that there is a thermal runaway risk for at least one battery cell or battery module 200 of the battery pack 20, the activation instruction to each switch or pair of switches 22 corresponding to the at least one battery cell or battery module 200; and the protection circuit 26 which, when being connected with the at least one battery cell or battery module 200, transfers battery energy of the at least one battery cell or battery module 200 to the battery pack 20 or another battery pack 20 as thermal energy or electric energy.

In at least one exemplary embodiment of the present disclosure, the detection and prediction component 24 may be configured to detect or predict whether there is a thermal runaway risk for each battery cell or battery module 200 of the battery pack 20 in the following manner: collecting information of every battery cell or battery module 200 of the battery pack 20; detecting or predicting, based on the collected information, whether there is a thermal runaway risk for each battery cell or battery module 200 of the battery pack 20.

During practical implementation, the protection circuit 26, when being connected with the at least one battery cell or battery module 200, may transfer the battery energy of the at least one battery cell or battery module 200 to the battery pack 20 or another battery pack 20 as thermal energy or electric energy in at least one of the following modes.

(1) A first transferring mode is to transfer the battery energy of the at least one battery cell or battery module 200 to the battery pack 20 or another battery pack 20 as thermal energy through a battery coolant loop for the battery pack 20 or another battery pack 20.

In the first transferring mode, the protection circuit 26 includes at least one of the following elements connected in or connected to the battery coolant loop for the battery pack 20 or another battery pack 20: a heating device (which may include at least one of: a resistive heater, a Positive Temperature Coefficient (PTC) heater, a High Voltage (HV) heater), a coolant pump (which is used for driving the coolant to flow in the battery coolant loop, so that thermal exchange can be conducted with elements connected in or to the battery coolant loop), a traction motor, an inverter (the traction motor and the inverter can serve as heat generation devices by running at an efficiency (e.g., zero torque which leads to zero efficiency) lower than a preset efficiency threshold), a charger.

In at least one exemplary embodiment of the present disclosure, the heating device includes at least one of: a resistive heater, a Positive Temperature Coefficient (PTC) heater, a High Voltage (HV) heater; or, the traction motor and the inverter serve as heat generation devices by running at an efficiency lower than a preset efficiency threshold.

In at least one exemplary embodiment of the present disclosure, in a case where the at least one element connected in or connected to the battery coolant loop for the battery pack 20 or another battery pack 20 requires a voltage higher than a voltage of the at least one battery cell or battery module 200, for example, if the an HV heater is adopted to serve as the heating device, the at least one battery cell or battery module 200 can be connected with the at least one element through at least one step-up DC/DC converter which increases the voltage of the at least one battery cell or battery module 200 to the voltage required by the at least one element.

(2) A second transferring mode is to transfer the battery energy of the at least one battery cell or battery module 200 to the battery pack 20 or another battery pack 20 as thermal energy through heating elements attached to battery sidewalls for battery cells or battery modules 200 of the battery pack 20 or another battery pack 20.

In the second transferring mode, the protection circuit 26 includes the heating elements (which may include at least one of: resistive heaters, resistive heating elements) attached to the battery sidewalls for the battery cells or battery modules 200 of the battery pack 20 or another battery pack 20.

(3) A third transferring mode is to transfer the battery energy of the at least one battery cell or battery module 200 to the battery pack 20 or another battery pack 20 as electric energy through discharging and recycling the battery energy of the at least one battery cell or battery module 200 to charge the battery pack 20 or another battery pack 20 with the help of at least one step-up DC/DC converter.

In the third transferring mode, the protection circuit 26 includes the at least one step-up DC/DC converter, and the at least one battery cell or battery module 200 is connected, through the at least one step-up DC/DC converter, to the entire battery pack 20, or another battery pack 20, or a group of battery cells or battery modules 200 in the battery pack 20, or a group of battery cells or battery modules 200 in another battery pack 20.

Among the three transferring modes, since the first and second transferring modes have the effect of transferring the energy of the risk battery cell or battery module 200 into heat, these two transferring modes are more suitable for the case where the battery pack 20 or another battery pack 20 is located in an environment with temperature lower than a temperature threshold (which may be set according to practical requirements). For the case where the battery pack 20 or another battery pack 20 is located in an environment with temperature higher than a temperature threshold, or the case where no thermal management for the battery pack 20 or another battery pack 20 is provided, the third transferring mode may be adopted.

By virtue of the solution in the aforementioned embodiments, the battery thermal runaway inside a risk battery cell or battery module 200 can be effectively prevented.

The modules or components described as separate parts may be or may not be separate physically. The part shown as the module may be or may not be a physical module, that is to say, it may be in a place or distributed on multiple network modules. It is possible to select, according to the actual needs, part or all of the modules or components to achieve the objective of the solutions in the present disclosure.

Moreover, all the function modules or components in the embodiments of the present disclosure may be integrated in a processing module; or the modules or components exist separately and physically; or two or more than two modules or components are integrated in a module. The integrated module may be realized in form of hardware or in form of software function module.

According to still another embodiment of the present disclosure, a detailed solution for preventing battery thermal runaway is described with reference to the drawings.

Three methods are proposed to control and dissipate the energy of the single problem cell:

In the method one, the energy of the single risky cell is transferred to the entire battery pack as heat, through the existing battery coolant loop, coolant pump, cold plate, etc.

In the method two, the energy of the single risky cell is transferred to the entire battery pack as heat, through resistive heating elements.

In the method three, the energy of the single risky cell is discharged and recycled to charge the battery pack or another battery pack with the help of DC/DC converters.

Method One

Figure 3A:
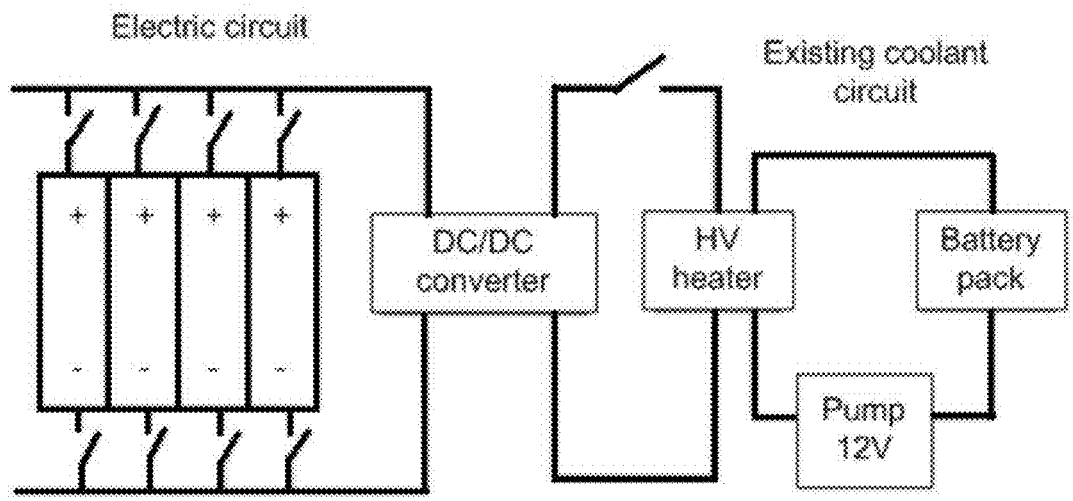
FIGS. 3(a) and 3(b) show schematic diagrams of the implementation of idea of the method one, which shows how energy of one of more battery cells is controlled and dissipated to heat up battery pack.
Figure 3B:
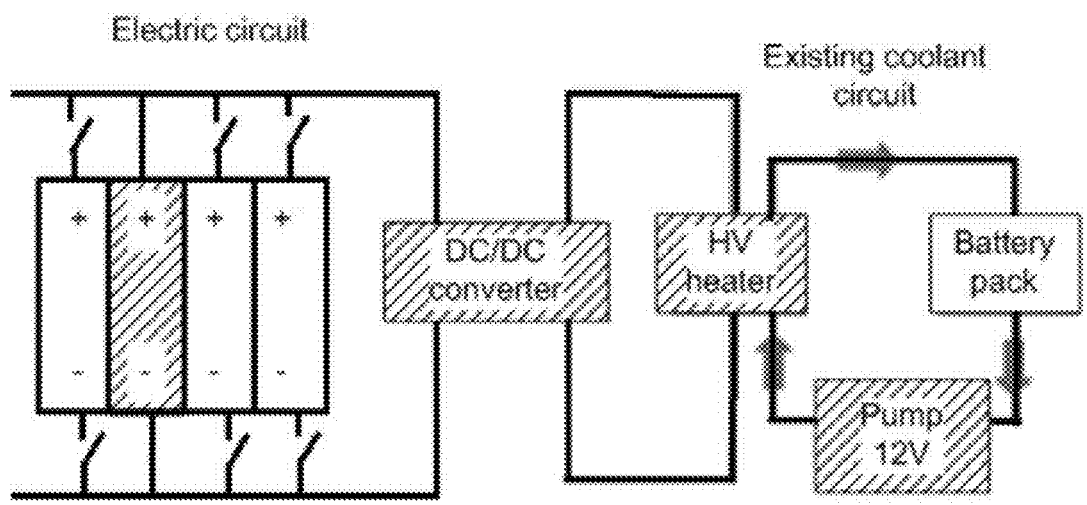

FIGS. 3(a) and 3(b) show schematic diagrams of the implementation of idea of the method one, which shows how energy of one of more battery cells is controlled and dissipated to heat up battery pack. FIG. 3(a) shows a normal operation mode, in which there is no detection of risky cells. In the normal operation mode, the protection circuit (including a DC/DC converter) is in open circuit mode. FIG. 3(b) shows a mode in which a risky cell is detected. In this mode, the cell (with pattern filling) is connected to the protection circuit. Cell voltage is raised up by DC/DC converter and heat up the battery pack by existing coolant loop. If a low-voltage heater is used, the DC/DC converter is not needed. The circuit shown in FIGS. 3(a) and 3(b) (e.g., each battery cell is connected to one or two switches) is not related to the original battery electric connection. FIGS. 3(a) and 3(b) show just one example of implementation, and there can be many other similar variations.

As shown in FIGS. 3(a) and 3(b), in the method one, the battery coolant loop is used for the regular purpose of battery thermal management. Usually a resistive heater or PTC heater is used to warm up coolant in the coolant loop to precondition the battery pack in cold weather. When a potential thermal runaway warning is detected for a certain battery cell, the battery cell is immediately connected with resistive heater or PTC heater.

If the cell voltage does not work with existing battery heater (e.g., high voltage heater), a DC-DC converter may be used to increase the cell voltage to the proper value to dissipate cell energy to the battery heater. It is also possible to add a low-voltage coolant heater (whose voltage matches the cell voltage), so that the cell energy can directly be dumped to this specific coolant heater without using a DC-DC converter. In most cases, the coolant pump can be readily powered by 12 VDC low voltage battery on the car.

If original HV heater is used, DC-DC converters may be needed to increase the cell voltage to a desired high level. If a low-voltage heater is used, then the DC-DC converter is not necessary.

Figure 4:
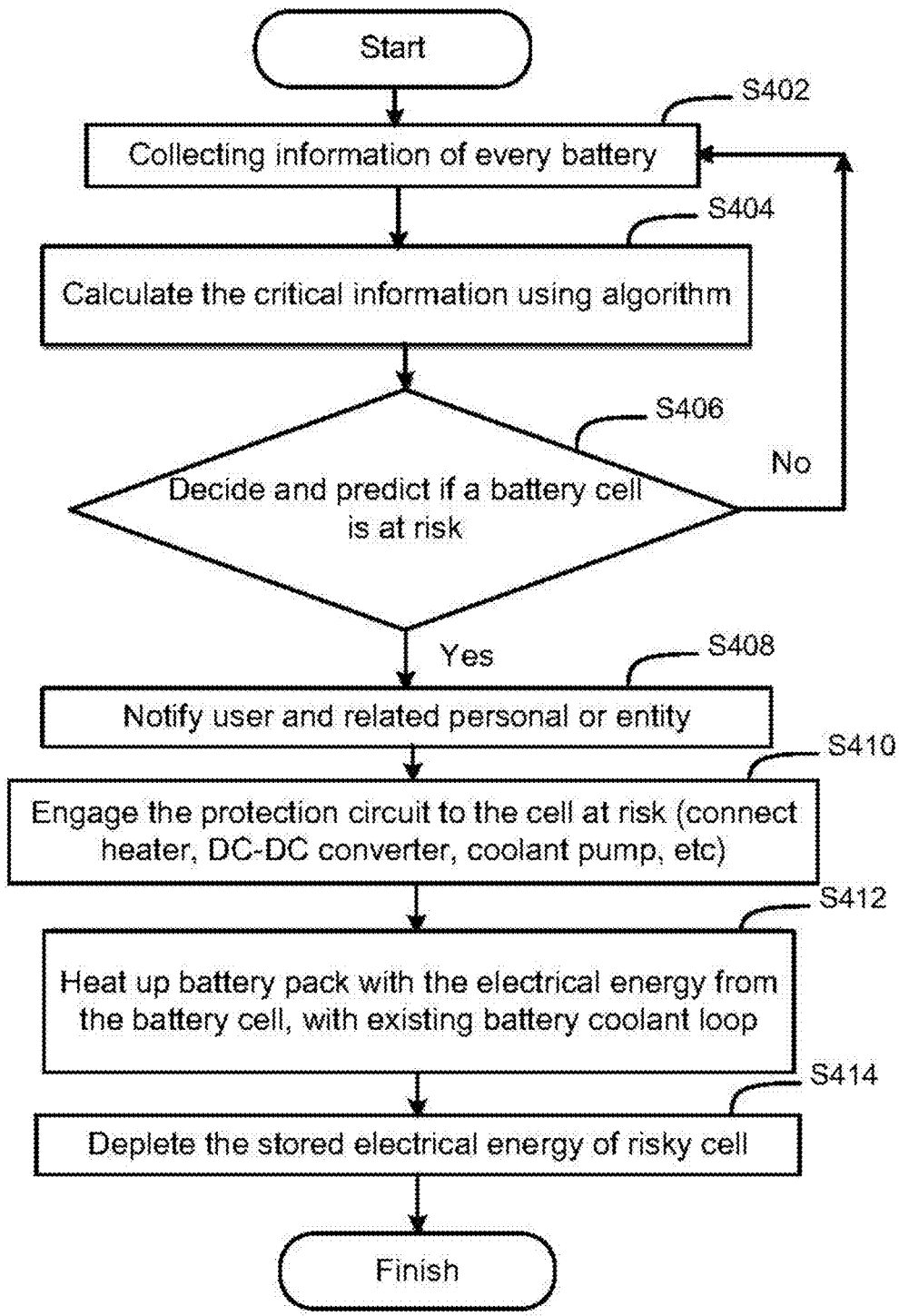
FIG. 4 shows an exemplary flowchart of a possible control algorithm for the idea of the method one, in which electric energy of a high-risk battery is controlled to heat up battery pack.

FIG. 4 shows an exemplary flowchart of a possible control algorithm for the idea of the method one, in which electric energy of a high-risk battery is controlled to heat up battery pack. The algorithm is just one example of the control algorithm. There may be various other algorithms.

In operation S402, information of every battery is collected.

In operation S404, the critical information related to battery thermal runaway detection is calculated using algorithm.

In operation S406, if a battery cell is at risk is decided and predicted.

In operation S408, user and related personal or entity are notified of the risk.

In operation S410, the protection circuit is engaged to the cell at risk (connect heater, DC/DC converter, coolant pump, etc.).

In operation S412, the battery pack is heated up with the electrical energy from the battery cell, with existing battery coolant loop.

In operation S414, the stored electrical energy of the risky cell is depleted finally.

In some vehicle's thermal management design, the coolant loop of the traction battery pack can also be connected in series with traction motor, inverter, DC/DC converter, charger, or other component. For example, in GAC AION S, AION LX, the battery cooling loop and motor/inverter can be connected in either series or parallel mode. In this case, the other components can also be used as heat sink, in addition to the traction battery pack, which can further increase the total heat sink's thermal mass (heat absorption ability).

Method Two

FIGS. 5(a) to 5(d) are schematic diagrams of the implementation of idea of the method two, which shows how energy of one of more battery cells is controlled and dissipated to heat up battery pack. FIGS. 5(a) to 5(d) (e.g., each battery cell is connected to one or two switches) is not related to the original battery electric connection.

Figure 5A:
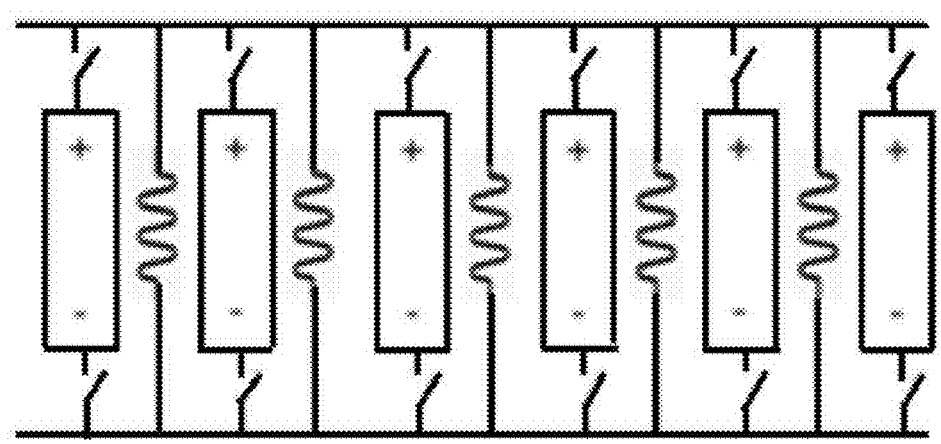
FIGS. 5(a) to 5(d) are schematic diagrams of the implementation of idea of the method two, which shows how energy of one of more battery cells is controlled and dissipated to heat up battery pack.

FIG. 5(a) shows a normal operation mode, in which there is no detection of Thermal Runaway risk in any one of the battery group. In the normal operation mode, the heating circuit is in open circuit mode. There is a heating element next to each of the battery cell.

Figure 5B:
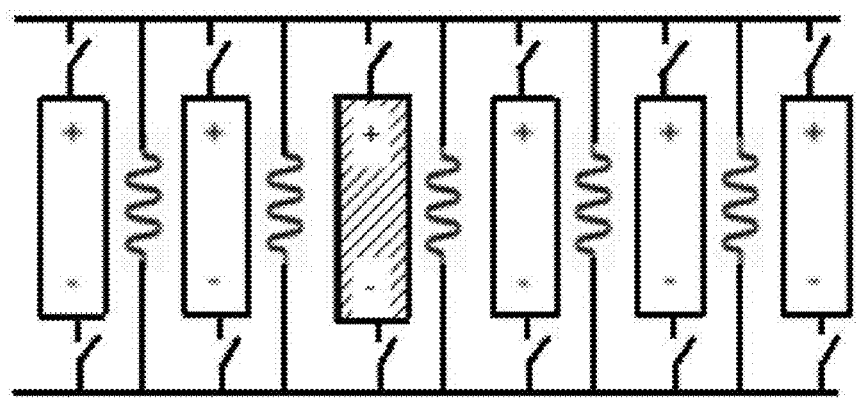

In FIG. 5(b), thermal Runaway risk is detected in one battery cell (with pattern filling).

Figure 5C:
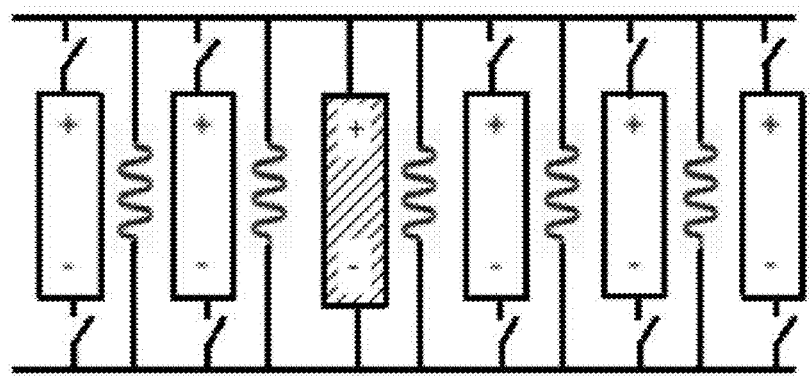

In FIG. 5(c), the battery Cell with TR warning is connected with the heating circuit. Multiple battery cells or the whole battery pack is heated up using the energy in the battery with TR warning.

Figure 5D:
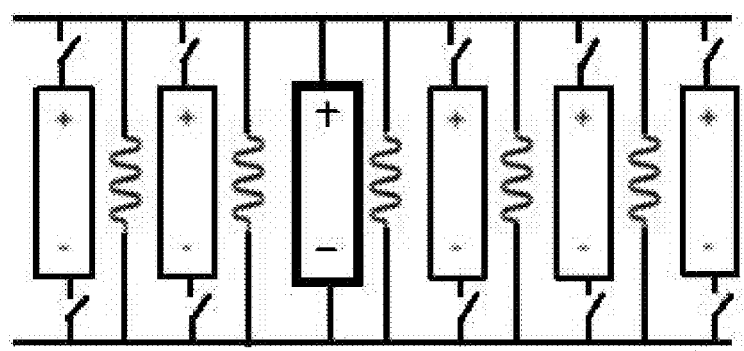

In FIG. 5(d), the electrical energy in the battery with TR warning is completely depleted. The whole battery pack is heated up for only a small amount due to the comparable large thermal capacity of the battery pack.

As shown in FIGS. 5(a) to 5(d), in method two, there is no coolant loop for the regular purpose of battery thermal management. (For example, a refrigerant loop is used for battery thermal management). Instead, a few resistive heaters or heating elements are attached to the battery sidewall to precondition the battery pack in cold weather. When a potential thermal runaway warning is detected for a battery cell, the battery cell is immediately connected with resistive heaters or heating elements.

Figure 6:
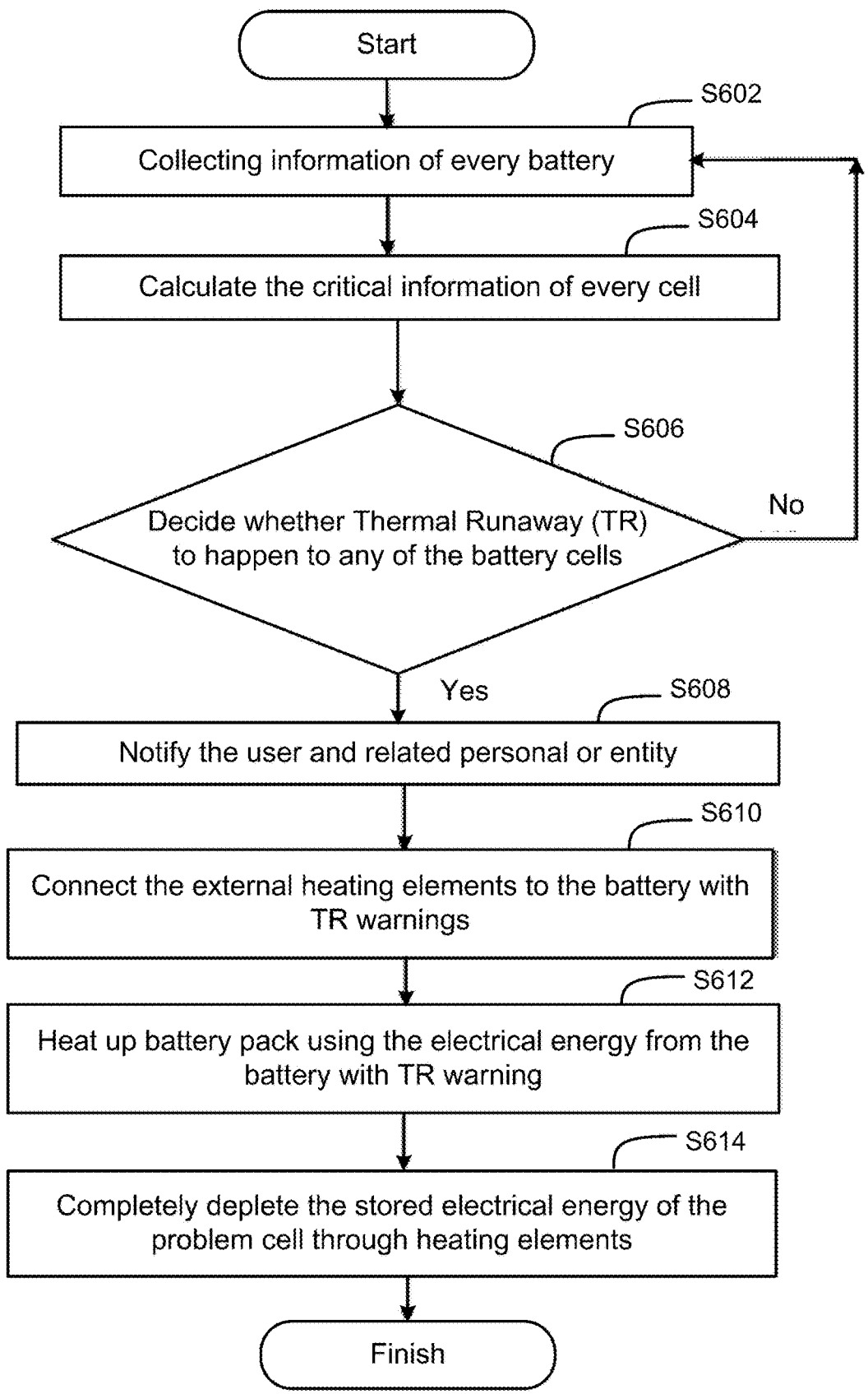
FIG. 6 shows an exemplary flowchart of a possible control algorithm for the idea of the method two, in which electric energy of a high-risk battery is controlled and dissipated to heat up battery pack.

FIG. 6 shows an exemplary flowchart of a possible control algorithm for the idea of the method two, in which electric energy of a high-risk battery is controlled and dissipated to heat up battery pack. The algorithm is just one example of the control algorithm. There may be various other algorithms.

In operation S602, information of every battery is collected.

In operation S604, the critical information related to battery thermal runaway detection is calculated.

In operation S606, if Thermal Runaway (TR) happens to any of the battery cells is decided and predicted.

In operation S608, user and related personal or entity are notified of the risk.

In operation S610, the external heating elements are connected to the battery with TR warnings.

In operation S612, the battery pack is heated up using the electrical energy from the battery with TR warning.

In operation S614, the stored electrical energy of the problem cell is completely depleted though the heating elements.

Method Three

Figure 7A:
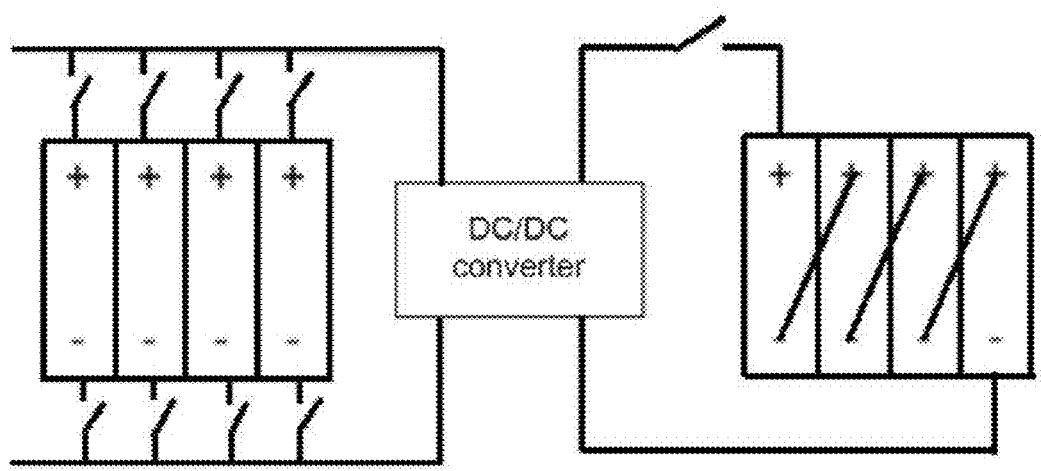
FIGS. 7(a) and 7(b) are schematic diagrams of the implementation of idea of the method three, which shows how energy of one of more battery cells is controlled and dissipated to charge the battery pack or another battery pack.
Figure 7B:
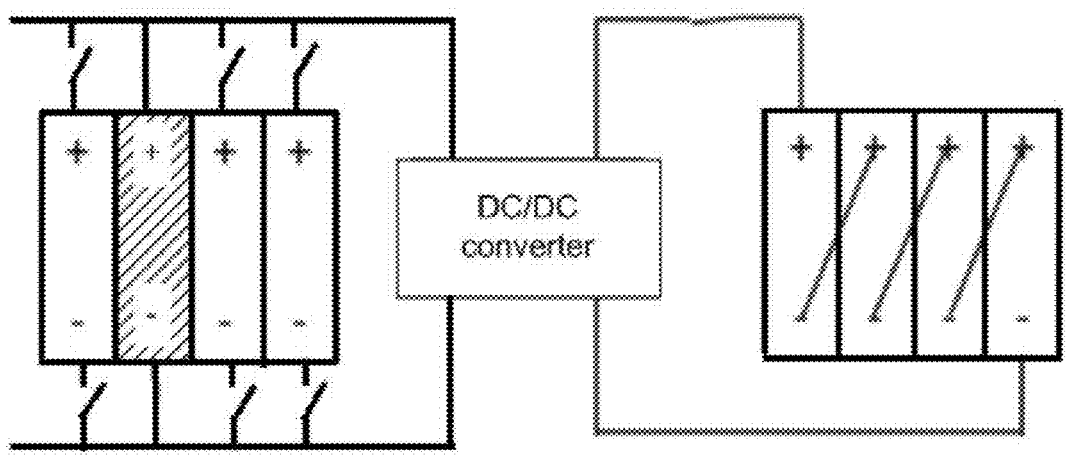

FIGS. 7(a) and 7(b) are schematic diagrams of the implementation of idea of the method three, which shows how energy of one of more battery cells is controlled and dissipated to charge the battery pack or another battery pack. The circuit shown in FIGS. 7(a) and 7(b) (e.g., each battery cell containing two switches) is not related to the original battery electric connection, which can be connected in serious or in parallel to create to desired voltage.

FIG. 7(a) shows a normal operation mode in which there is no detection of internal short circuits in any one of the battery group. In the normal operation mode, the protection circuit (including a DC/DC converter) is in open circuit mode.

In FIG. 7(b), thermal Runaway (TR) risk is detected. The battery with TR (with pattern filling) is connected with the protection circuit. The low voltage of the battery with TR is raised up through the DC/DC converter and charges another battery module/pack.

As shown in FIGS. 7(a) and 7(b), in the method three, there is no thermal management for the battery system. It could be due to insufficient space or other reasons. In this case, there could still be possibility for thermal runaway to happen for one of the battery cells. In this case, the energy of the problem cell is controlled to charge the entire battery pack or a group of batteries cells (e.g., other cells/modules in the traction battery pack) after a thermal runaway risk is detected for a cell. If needed, several DC/DC converters can be provided to increase the voltage to the desired level. The batteries to be charged can be other cells or other modules of the same battery pack, or other battery module/pack. Note this method will not work when all the battery cells are 100% fully charged, which is very rare. The diagram below is just one example of implementation, and there may be many other variations.

Figure 8:
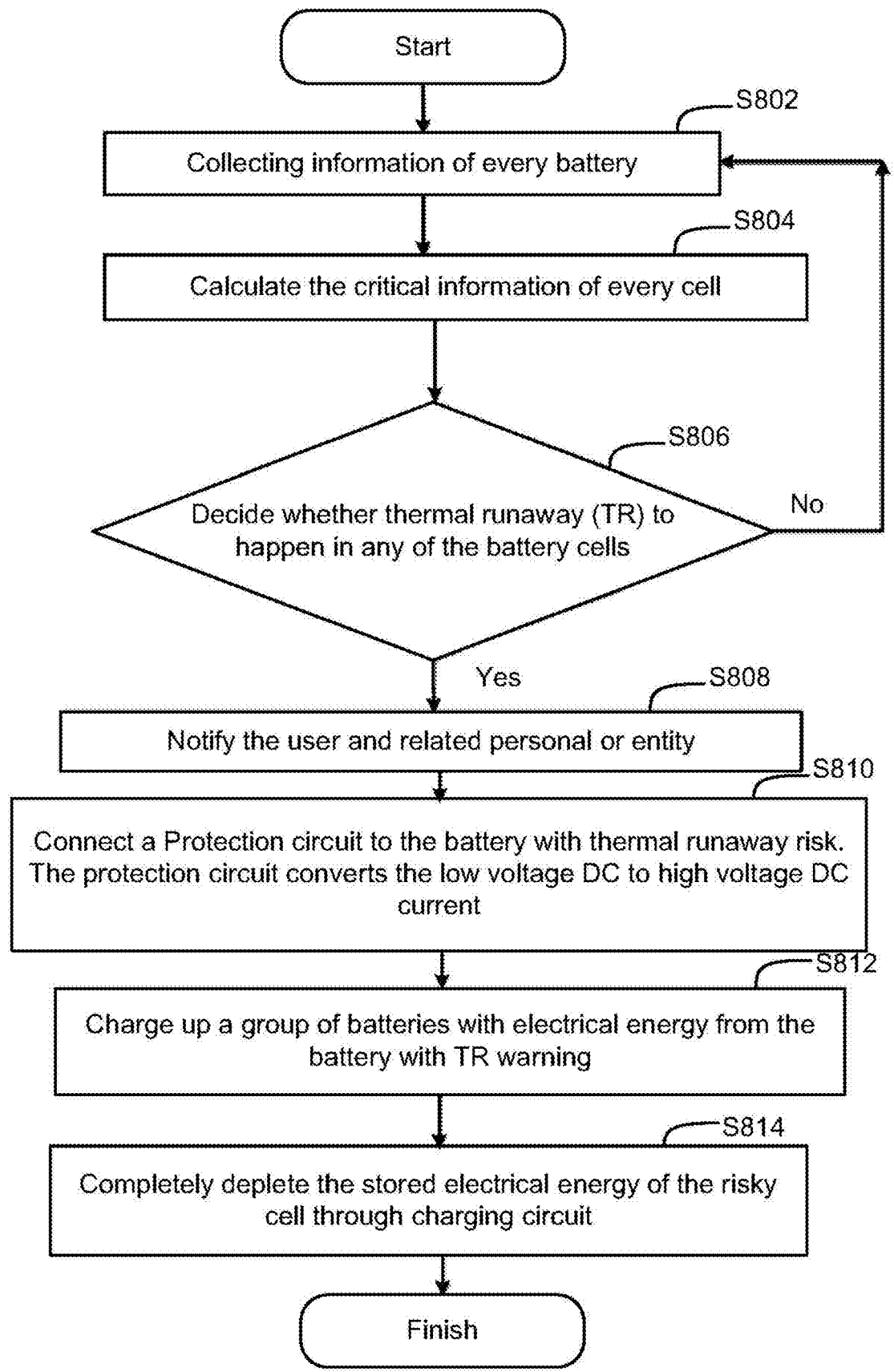
FIG. 8 shows an exemplary flowchart of a possible control algorithm for the idea of the method three, in which electric energy of a high-risk battery is controlled and to charge battery pack.

FIG. 8 shows an exemplary flowchart of a possible control algorithm for the idea of the method three, in which electric energy of a high-risk battery is controlled and to charge battery pack. Below is just one example of the control algorithm. The algorithm is just one example of the control algorithm. There may be various other algorithms.

In operation S802, information of every battery is collected.

In operation S804, the critical information related to battery thermal runaway detection is calculated.

In operation S806, if Thermal Runaway (TR) happens to any of the battery cells is decided and predicted.

In operation S808, user and related personal or entity are notified of the risk.

In operation S810, a protection circuit is connected to the battery with thermal runaway risk. The protection circuit converts the low voltage DC to high voltage DC current.

In operation S812, a group of batteries is charged with the electrical energy from the battery with TR warning.

In operation S814, the stored electrical energy of the risky cell is completely depleted though the charging circuit.

Further Discussion

In some cases, the battery coolant loop does not have a designated resistive heater (such as PTC heater, strip heater, film heater, used in most EV). For example, in Tesla Model 3, to heat up battery heater in cold weather, the drive unit (inverter+electric motor+gear box) are intentionally run at low efficiency, e.g., zero torque (zero efficiency) or low torque (low efficiency), and the waste heat from motor/inverter are used to heat up the battery pack by a coolant loop. In this case, there may be two methods to dissipate the problem cell energy to batter pack:

(1) The risky cell's energy may be dissipated to the motor/inverter directly using the motor/inverter as heat generation device. The system will run in the original waster heat mode. No PTC heater is needed. The cell dumps all the electric energy to the drive unit, which can transfer heat to battery pack via the existing battery coolant loop. In reality, the drive unit has large thermal mass, can also serve as heat absorption medium in addition to battery pack. A DC converter may be needed.

(2) An additional battery heater may be added, through which the cell can heat the coolant loop, without running the motor. This is just like regular vehicle without waste heat mode.

The ideas mentioned can be applied to prevent various failures of battery cells, including but not limited to thermal runaway due to internal shorting circuit, lithium dendrites growth, or other mechanisms.

It should be noted that in the above embodiments of the present disclosure, the problem cell may alternatively be a problem module instead, and the above energy dissipation concept will still apply.

In addition to EV batteries, the concept may be applied to other types of lithium ion batteries for other applications, such as cell phone, laptop notebook, portable device, energy storage station, power bank, electric vehicles, electric bikes, electric robots, etc.

The proposed method contains hardware (DC/DC converter, heater, switch, etc.) and control algorithm. The hardware will be installed on electric vehicles (or other relevant devices).

To sum up, the solution of the embodiments of the present disclosure controls and dissipates the energy of the single risky cell/module (or multiple risky cells/modules) to the entire traction battery pack (or another battery pack), using the existing battery and battery thermal management system (coolant loop, coolant pump, cold plate, battery heater, etc.) or by charging the battery pack or another battery pack with the electrical energy of the risky cell/module. Once a cell/module is de-energized, it will have much lower chance of thermal runaway and propagation to neighbor cells.

The above is only the exemplary embodiments of the present disclosure; it should be indicated that, on the premise of not departing from the principles of the present disclosure, those of ordinary skill in the art may also make a number of improvements and supplements, and these improvements and supplements should fall within the scope of protection of the present disclosure.

What is claimed is:

1. A method for preventing battery thermal runaway, comprising:
   connecting switches or pairs of switches with respective battery cells or battery modules of a battery pack;
   controlling, upon receiving an activation instruction, connection of respective battery cells or battery modules of the battery pack to a protection circuit;
   detecting or predicting whether there is a thermal runaway risk for each of the battery cells or the battery modules of the battery pack; and
   in response to detecting or predicting that there is a thermal runaway risk for at least one battery cell or battery module of the battery pack, sending the activation instruction to each switch or pair of switches corresponding to the at least one battery cell or battery module, transferring battery energy of the at least one battery cell or battery module to the battery pack or another battery pack as thermal energy or electric energy by the protection circuit.

2. The method as claimed in claim 1, wherein detecting or predicting whether there is a thermal runaway risk for each of the battery cells or the battery modules of the battery pack comprises:
   collecting information of every battery cell or battery module of the battery pack;
   detecting or predicting, based on the collected information, whether there is a thermal runaway risk for each battery cell or battery module of the battery pack.

3. The method as claimed in claim 1, wherein transferring battery energy of the at least one battery cell or battery module to the battery pack or another battery pack as thermal energy or electric energy comprises at least one of:
   a first transferring mode of transferring the battery energy of the at least one battery cell or battery module to the battery pack or another battery pack as thermal energy through a battery coolant loop for the battery pack or another battery pack;
   a second transferring mode of transferring the battery energy of the at least one battery cell or battery module to the battery pack or another battery pack as thermal energy through heating elements attached to battery sidewalls for battery cells or battery modules of the battery pack or another battery pack;
   a third transferring mode of transferring the battery energy of the at least one battery cell or battery module to the battery pack or another battery pack as electric energy through discharging and recycling the battery energy of the at least one battery cell or battery module to charge the battery pack or another battery pack with the help of at least one step-up DC/DC converter.

4. The method as claimed in claim 3, wherein in the first transferring mode, the at least one battery cell or battery module is connected with at least one of the following elements connected in or connected to the battery coolant loop for the battery pack or another battery pack: a heating device, a coolant pump, a traction motor, an inverter, a charger.

5. The method as claimed in claim 4, wherein the heating device comprises at least one of: a resistive heater, a Positive Temperature Coefficient (PTC) heater, a High Voltage (HV) heater; or,
   the traction motor and the inverter serve as heat generation devices by running at an efficiency lower than a preset efficiency threshold.

6. The method as claimed in claim 4, wherein in a case where the at least one element connected in or connected to the battery coolant loop for the battery pack or another battery pack requires a voltage higher than a voltage of the at least one battery cell or battery module, the at least one battery cell or battery module is connected with the at least one element through at least one step-up DC/DC converter which increases the voltage of the at least one battery cell or battery module to the voltage required by the at least one element.

7. The method as claimed in claim 3, wherein the heating elements comprise at least one of: resistive heaters, resistive heating elements.

8. The method as claimed in claim 3, wherein in the third transferring mode, the at least one battery cell or battery module is connected, through the at least one step-up DC/DC converter, to the entire battery pack, or another battery pack, or a group of battery cells or battery modules in the battery pack, or a group of battery cells or battery modules in another battery pack.

9. The method as claimed in claim 8, wherein
   in a case where the battery pack or another battery pack is located in an environment with temperature lower than a temperature threshold, the first transferring mode or the second transferring mode is adopted; and/or,
   in a case where no thermal management for the battery pack or another battery pack is provided, the third transferring mode is adopted.

10. A system for preventing battery thermal runaway, comprising:
    a battery pack provided with multiple battery cells or battery modules;
    switches or pairs of switches connected with respective battery cells or battery modules of the battery pack, and used for controlling, upon receiving an activation instruction, connection of respective battery cells or battery modules of the battery pack to a protection circuit;
    a detection and prediction component, configured to detect or predict whether there is a thermal runaway risk for each battery cell or battery module of the battery pack, and send, in response to detecting or predicting that there is a thermal runaway risk for at least one battery cell or battery module of the battery pack, the activation instruction to each switch or pair of switches corresponding to the at least one battery cell or battery module; and
    the protection circuit which, when being connected with the at least one battery cell or battery module, transfers battery energy of the at least one battery cell or battery module to the battery pack or another battery pack as thermal energy or electric energy.

11. The system as claimed in claim 10, wherein the detection and prediction component is configured to detect or predict whether there is a thermal runaway risk for each battery cell or battery module of the battery pack in the following manner:
    collecting information of every battery cell or battery module of the battery pack;
    detecting or predicting, based on the collected information, whether there is a thermal runaway risk for each battery cell or battery module of the battery pack.

12. The system as claimed in claim 10, wherein the protection circuit, when being connected with the at least one battery cell or battery module, transfers the battery energy of the at least one battery cell or battery module to the battery pack or another battery pack as thermal energy or electric energy in at least one of the following modes:
  a first transferring mode of transferring the battery energy of the at least one battery cell or battery module to the battery pack or another battery pack as thermal energy through a battery coolant loop for the battery pack or another battery pack;
  a second transferring mode of transferring the battery energy of the at least one battery cell or battery module to the battery pack or another battery pack as thermal energy through heating elements attached to battery sidewalls for battery cells or battery modules of the battery pack or another battery pack;
  a third transferring mode of transferring the battery energy of the at least one battery cell or battery module to the battery pack or another battery pack as electric energy through discharging and recycling the battery energy of the at least one battery cell or battery module to charge the battery pack or another battery pack with the help of at least one step-up DC/DC converter.

13. The system as claimed in claim 12, wherein in the first transferring mode, the protection circuit comprises at least one of the following elements connected in or connected to the battery coolant loop for the battery pack or another battery pack: a heating device, a coolant pump, a traction motor, an inverter, a charger.

14. The system as claimed in claim 13, wherein the heating device comprises at least one of: a resistive heater, a Positive Temperature Coefficient (PTC) heater, a High Voltage (HV) heater; or,
  the traction motor and the inverter serve as heat generation devices by running at an efficiency lower than a preset efficiency threshold.

15. The system as claimed in claim 13, wherein in a case where the at least one element connected in or connected to the battery coolant loop for the battery pack or another battery pack requires a voltage higher than a voltage of the at least one battery cell or battery module, the at least one battery cell or battery module is connected with the at least one element through at least one step-up DC/DC converter which increases the voltage of the at least one battery cell or battery module to the voltage required by the at least one element.

16. The system as claimed in claim 12, wherein the heating elements comprise at least one of: resistive heaters, resistive heating elements.

17. The system as claimed in claim 12, wherein in the third transferring mode, the protection circuit comprises the at least one step-up DC/DC converter, and the at least one battery cell or battery module is connected, through the at least one step-up DC/DC converter, to the entire battery pack, or another battery pack, or a group of battery cells or battery modules in the battery pack, or a group of battery cells or battery modules in another battery pack.

18. The system as claimed in claim 12, wherein
  in a case where the battery pack or another battery pack is located in an environment with temperature lower than a temperature threshold, the first transferring mode or the second transferring mode is adopted for the protection circuit; and/or,
  in a case where no thermal management for the battery pack or another battery pack is provided, the third transferring mode is adopted for the protection circuit.

* * * * *